(12) United States Patent  
Germain et al.

(10) Patent No.: US 6,734,769 B1  
(45) Date of Patent: May 11, 2004

(54) GFCI RECEPTACLE HAVING BLOCKING MEANS

(75) Inventors: Frantz Germain, Rosedale, NY (US); Stephen Stewart, Berrien Springs, MI (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/334,182

(22) Filed: Dec. 30, 2002

(51) Int. Cl.[7] ................................................. H02H 3/00
(52) U.S. Cl. ............................ 335/6; 361/42; 200/43.02
(58) Field of Search ................................. 335/6, 18, 21, 335/24, 25, 26, 157, 158, 202; 361/42–50; 200/43.01, 43.02, 43.11–43.22

(56) References Cited

U.S. PATENT DOCUMENTS

| | | | | |
|---|---|---|---|---|
| 4,595,894 A | * | 6/1986 | Doyle et al. ................... | 335/18 |
| 6,040,967 A | * | 3/2000 | DiSalvo ......................... | 361/42 |
| 6,246,558 B1 | * | 6/2001 | DiSalvo et al. ................ | 361/42 |
| 6,282,070 B1 | * | 8/2001 | Ziegler et al. ................. | 361/42 |
| 6,288,882 B1 | * | 9/2001 | DiSalvo et al. ................ | 361/42 |

* cited by examiner

Primary Examiner—Ramon M. Barrera  
(74) Attorney, Agent, or Firm—Paul J. Sutton

(57) ABSTRACT

A blocking member located within the body of the GFCI is positioned by the reset button to allow free access of the prongs of a plug into the openings of the receptacle when the reset button is depressed or to block at least one opening of the receptacle to prevent a plug from entering the openings of the receptacle when the reset button projects out beyond the surface of the housing. Thus, when the GFCI is in a conducting state, the reset button is recessed within the GFCI housing and positions the blocking member to the first position to allow the prongs of a plug to be inserted into the receptacle openings. When the GFCI is in a non-conducting state, the reset button protrudes outward from the housing of the GFCI to position the blocking member to the second position to block at least one opening of the receptacle to prevent the prongs of a plug from entering the receptacle.

26 Claims, 7 Drawing Sheets

GFCI RECEPTACLE HAVING BLOCKING MEANS

BACKGROUND OF THE INVENTION

1. Field

The present invention relates generally to resettable circuit interrupting devices and systems and more particularly to a ground fault circuit interrupter (GFCI) device and receptacle having plug blocking means.

2. Description of the Related Art

Many electrical wiring devices have a line side, which is connectable to an electrical power supply, a load side which is connectable to one or more loads and at least one conductive path between the line and load sides. Electrical connections to wires supplying electrical power or wires conducting electricity to one or more loads can be at the line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters (GFCI). Presently available GFCI devices, such as the device described in commonly owned U.S. Pat. No. 4,595,894 ('894), use an electrically activated trip mechanism to mechanically break an electrical connection between the line side and the load side. Such devices are resettable after they are tripped by, for example, detection of a ground fault. In the device disclosed in the '894 patent, the trip mechanism used to cause the mechanical breaking of the circuit (i.e., the conductive path between the line and load sides) includes a solenoid or trip coil. A test button is used to test the trip mechanism and circuitry is provided to sense faults. A reset button is provided to reset the electrical connection between the line and load sides.

However, instances may arise where an abnormal condition such as a lightning strike may result not only in a surge of electricity at the device which can cause a tripping of the device but can also disable the trip mechanism used to cause the mechanical breaking of the circuit. This can occur without the knowledge of the user. Under such circumstances an unknowing user, faced with a GFCI which has tripped, may press the reset button which, in turn, will cause the device with an inoperative trip mechanism to be reset without the ground fault protection being available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, a GFCI device which has tripped, may be reset even though the open neutral condition may remain.

Commonly owned U.S. Pat. No. 6,040,967, which is incorporated herein in its entirety by reference, describes a family of resettable circuit interrupting devices capable of locking out the reset portion of the device if the circuit interrupting portion is non-operational or if an open neutral condition exists. Circuit interrupting devices normally have a user accessible load side connection such as a GFCI protected receptacle in addition to line and load side connections such as binding screws. The user accessible load side connected receptacle can be used to connect an appliance such as a toaster or the like to electrical power supplied from the line side. The load side connection and the receptacle are typically electrically connected together. As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. This is known as reverse wiring. Such wiring is prevalent in new construction, where power is not yet provided to the residence branch circuits and the electrician has difficulty in distinguishing between the line side and load side conductors. In the event the circuit interrupting device is reverse wired, the user accessible load connection may not be protected, even if fault protection to the load side connection remains.

A resettable circuit interrupting device, such as a GFCI device, that includes reverse wiring protection, and optionally an independent trip portion and/or a reset lockout portion is disclosed in U.S. Pat. No. 6,246,558, ('558) assigned to the same assignee as this invention and incorporated herein by reference in its entirety. Patent '558 utilizes bridge contacts located within the GFCI to isolate the conductors to the receptacle contacts from the conductors to the load if the line side wiring to the GFCI is improperly connected to the load side when the GFCI is in a tripped state. The trip portion operates independently of the circuit interrupting portion used to break the electrical continuity in one or more conductive paths in the device. The reset lockout portion prevents reestablishing electrical continuity of an open conductive path if the circuit interrupting portion is not operational or if an open neutral condition exists.

While the breaking of the electrical circuit and the utilization of bridge contacts provides electrical isolation protection between the load conductors and the receptacle contacts when the GFCI is in a tripped or non-conducting state, means which can prevent the prongs of a plug from being inserted into the receptacle of a GFCI when in a non-conducting state, either with or without the bridge contacts is desired to provide added user safety.

SUMMARY OF THE INVENTION

In one embodiment, the circuit interrupting device such as a GFCI includes phase and neutral conductive paths disposed at least partially within a housing between the line and load sides. The phase conductive path terminates at a first connection capable of being electrically connected to a source of electricity, a second connection capable of conducting electricity to at least one load and a third connection capable of conducting electricity to at least one user accessible load through a receptacle. Similarly, the neutral conductive path terminates at a first connection capable of being electrically connected to a source of electricity, a second connection capable of providing a neutral connection to the at least one load and a third connection capable of providing a neutral connection to the at least one user accessible load through the receptacle. The first and second connections can be screw terminals.

The GFCI also includes a circuit interrupting portion disposed within the housing and configured to cause electrical discontinuity in one or both of the phase and neutral conductive paths between the line side and the load side upon the occurrence of a predetermined condition. A reset portion activated by depressing a spring loaded reset button disposed at least partially within the housing is configured to reestablish electrical continuity in the open conductive paths. The reset button assumes a first or a second position which is determined by the conductive state of the GFCI. When the GFCI is in a conducting state, the reset button is substantially fully depressed within the housing of the GFCI, here referred to as a first position. When the GFCI is in a non-conducting state, the reset button projects outward beyond the top surface of the housing of the GFCI, here referred to as the second position.

The GFCI also includes a reset lockout that prevents reestablishing electrical continuity in either the phase or neutral conductive path, or both conductive paths if the circuit interrupting portion is not operating properly. Depression of the reset button causes at least a portion of the phase conductive path to contact at least one reset contact. When contact is made between the phase conductive path and the at least one reset contact the circuit interrupting portion is activated to disable the reset lockout portion and reestablish electrical continuity in the phase and neutral conductive paths.

The GFCI also includes a trip portion that operates independently of the circuit interrupting portion. The trip portion is disposed at least partially within the housing and is configured to cause electrical discontinuity in the phase and/or neutral conductive paths independently of the operation of the circuit interrupting portion. The trip portion includes a trip actuator, such as a button, accessible from the exterior of the housing and a trip arm preferably within the housing which extends from the trip actuator. The trip arm is configured to facilitate the mechanical breaking of electrical continuity in the phase and /or neutral conductive paths when the trip actuator is actuated.

Located within a GFCI device having a receptacle is a movable contact bearing arm which is held in either a closed or open position with a fixed contact by a latching member that is connected to the spring loaded reset button. The reset button assumes a first or a second position which is determined by the conductive state of the GFCI. When the GFC is in a conducting state, the reset button is substantially fully depressed within the housing of the GFCI. When the GFCI is in a non-conductive state, the reset button projects outward beyond the top surface of the housing of the GCFI. Thus, the movable contact bearing-arm, acting through a latching member, determines the position of the reset button. A blocking member located within the body of the GFCI is positioned by the reset button to allow free access of the prongs of a plug into the openings of the receptacle when the reset button is depressed or to block at least one opening of the receptacle to prevent a plug from entering the openings of the receptacle when the reset button projects out beyond the surface of the housing. Thus, when the GFCI is in a conducting state, the reset button is recessed within the GFCI housing and positions the blocking member to the first position to allow the prongs of a plug to be inserted into the receptacle openings. When the GFCI is in a non-conducting state, the reset button protrudes outward from the housing of the GFCI to position the blocking member to the second position to block at least one opening of the receptacle to prevent the prongs of a plug from entering the receptacle. GFCI's normally have two separate sets of internally located contacts known as bridge contacts where one set is used to connect a load to the source of electricity and the second set is used to connect a user accessible load to the source of electricity. The bridge contacts provide isolation between the conductors to the load and the conductors to the contacts of the GFCI receptacle when the GFCI is in a fault state. In the GFCI here disclosed, the blocking member prevents the prongs of a plug from entering the receptacle when the GFCI is in a fault state and, therefore, can eliminate the need for the bridge contacts.

BRIEF DESCRIPTION OF THE DRAWINGS

Preferred embodiments of the present application are described herein with reference to the drawings in which similar elements are given similar reference characters, wherein.

DETAILED DESCRIPTION

Figure 1:
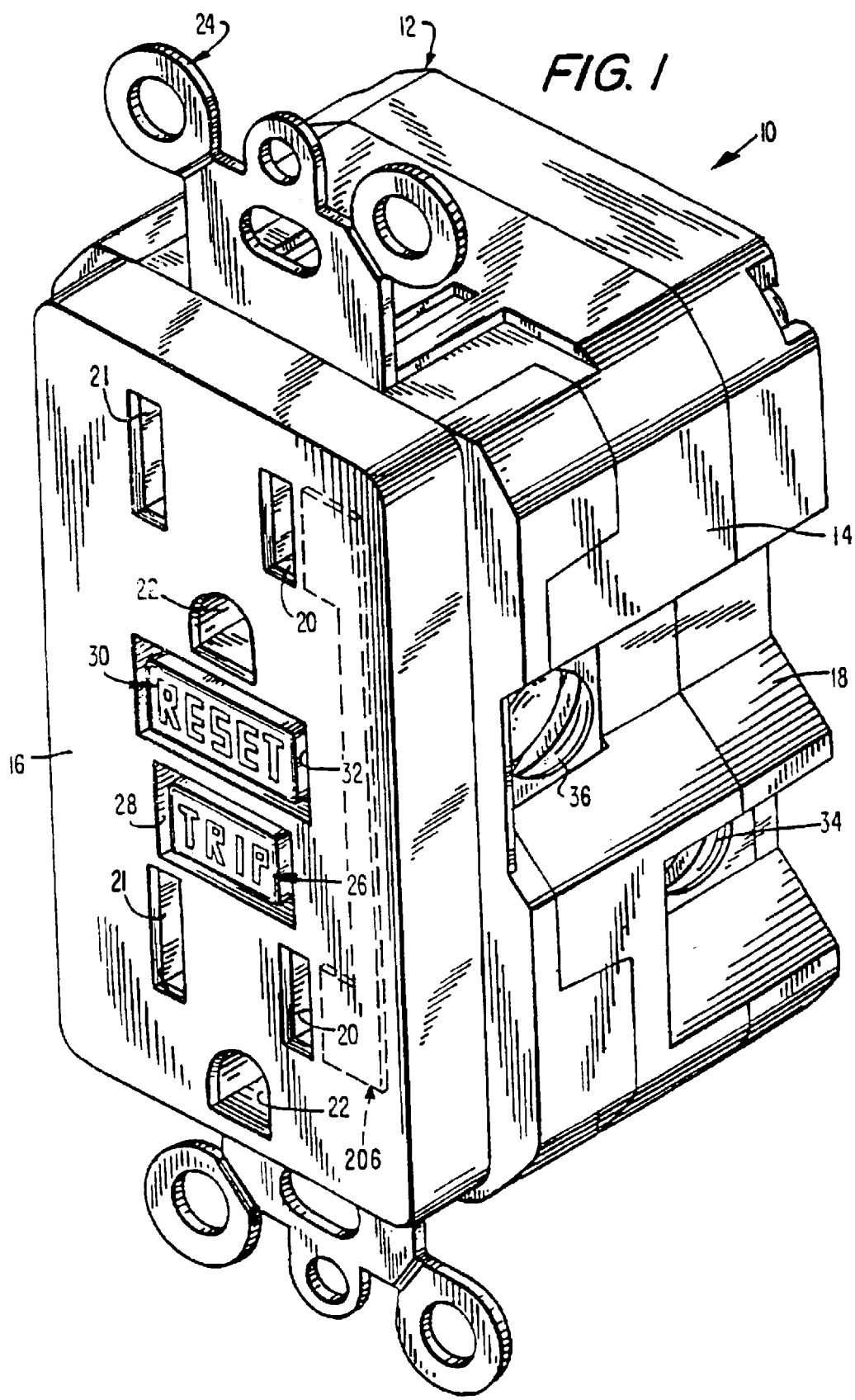
FIG. 1 is a perspective view of an embodiment of a prior art ground fault circuit interrupting (GFCI) device.

The present application contemplates various types of circuit interrupting devices that are capable of breaking at least one conductive path at both a line side and a load side of the device. The conductive path is typically divided between a line side that connects to supplied electrical power and a load side that connects to one or more loads. The term resettable circuit interrupting devices include ground fault circuit interrupters (GFCI's), arc fault circuit interrupters (AFCI's), immersion detection circuit interrupters (IDCI's), appliances leakage circuit interrupters (ALCI's), and equipment leakage circuit interrupters (ELCI's) which have a receptacle for receiving a plug.

For the purpose of the present application, the structure or mechanisms used in the circuit interrupting devices, shown in the drawings and described below, are incorporated into a GFCI protected receptacle which can receive at least one plug and is suitable for installation in a single gang junction box used in, for example, a residential electrical wiring system. However, the mechanisms according to the present application can be included in any of the various resettable circuit interrupting devices.

The GFCI receptacle described herein has line and load phase (or power) connectors, line and load neutral connectors and a plug receiving receptacle to provide user accessible load phase and neutral connections. These connectors can be, for example, electrical fastening devices that secure or connect external conductors to the circuit interrupting device. Examples of such connectors can include binding screws, lugs, terminals and external plug connections.

In one embodiment, the GFCI receptacle has a circuit interrupting portion, a reset portion, a reset lockout and a blocking member to prevent the prongs of a plug from entering the receptacle when the GFCI is in a fault or non-conducting state. The circuit interrupting and reset portions described herein use electromechanical components to break (open) and make (close) one or more conductive paths between the line and load sides of the device. However, electrical components such as solid state switches and supporting circuitry, may be used to open and close the conductive paths.

Generally, the circuit interrupting portion is used to automatically break electrical continuity in one or more conductive paths (i.e. open the conductive path) between the line and load sides upon the detection of a fault. The reset button is used to close the open conductive paths. The positioning of the blocking member to prevent the prongs of a plug from entering the openings in the receptacle when a fault is detected, is determined by the position of the reset button. A movable arm supporting at least one of the contacts between the line side and the load side, acting through a latching member, determines the position of the reset button. The reset button is used to disable the reset lockout, close the open conductive paths and reset the blocking member to its open position to permit a plug to be inserted into the receptacle. The reset button and reset lockout portions operate in conjunction with the operation of the circuit interrupting portion, so that electrical continuity cannot be reestablished and the blocking member continues to block at least one opening of the receptacle to prevent the prongs of a plug from entering the receptacle when the circuit interrupting portion is not operational, when an open neutral condition exists and/or the device is reverse wired.

The above described structure of a blocking member to selectively block at least one opening of the receptacle can be incorporated in any resettable circuit interrupting device, but for explanation purposes, the description herein is directed to GFCI receptacles.

Figure 2:
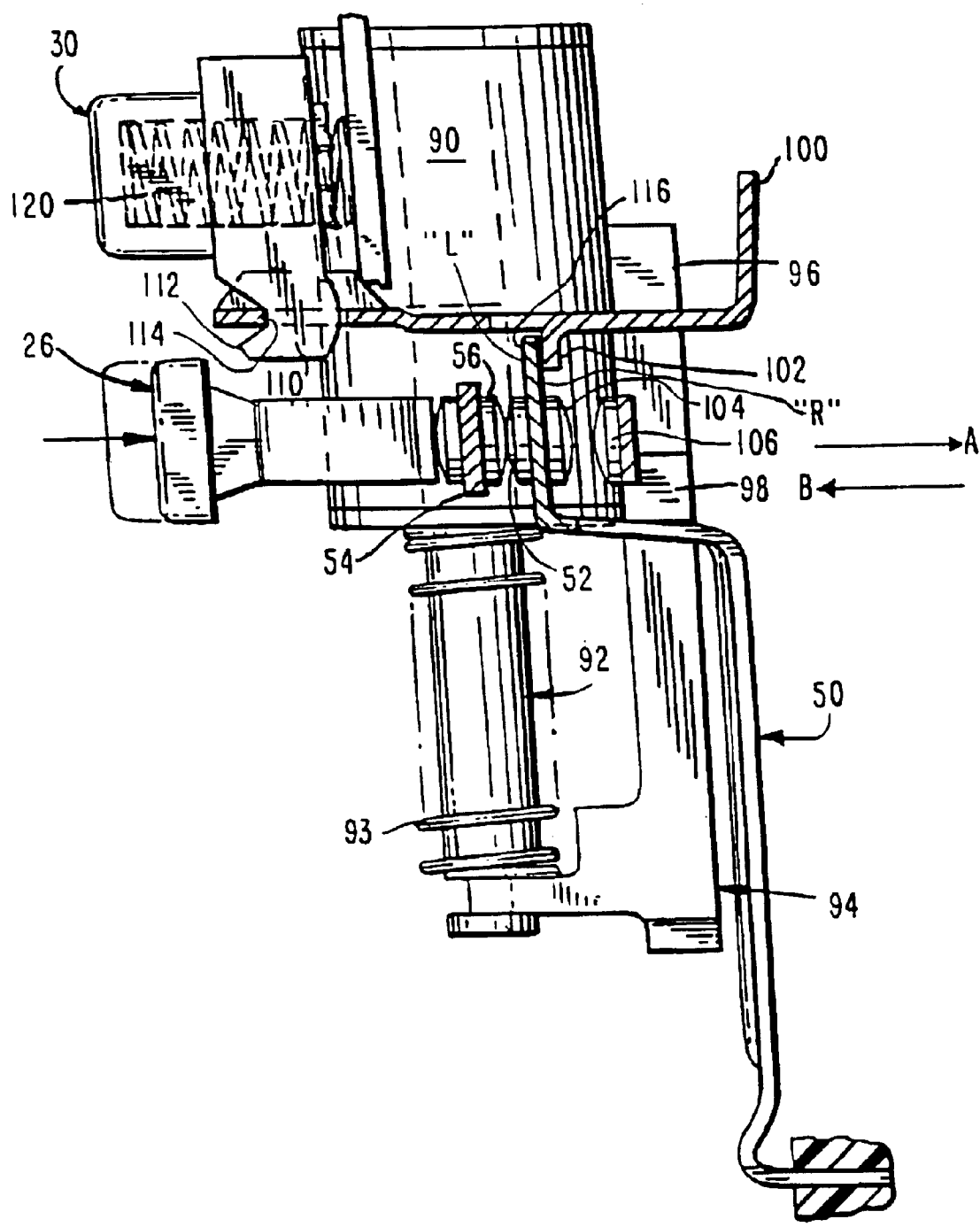
FIG. 2 is a side elevation view, partially in section, of a portion of the GFCI device shown in FIG. 1, illustrating the GFCI device in a conducting state.
Figure 3:
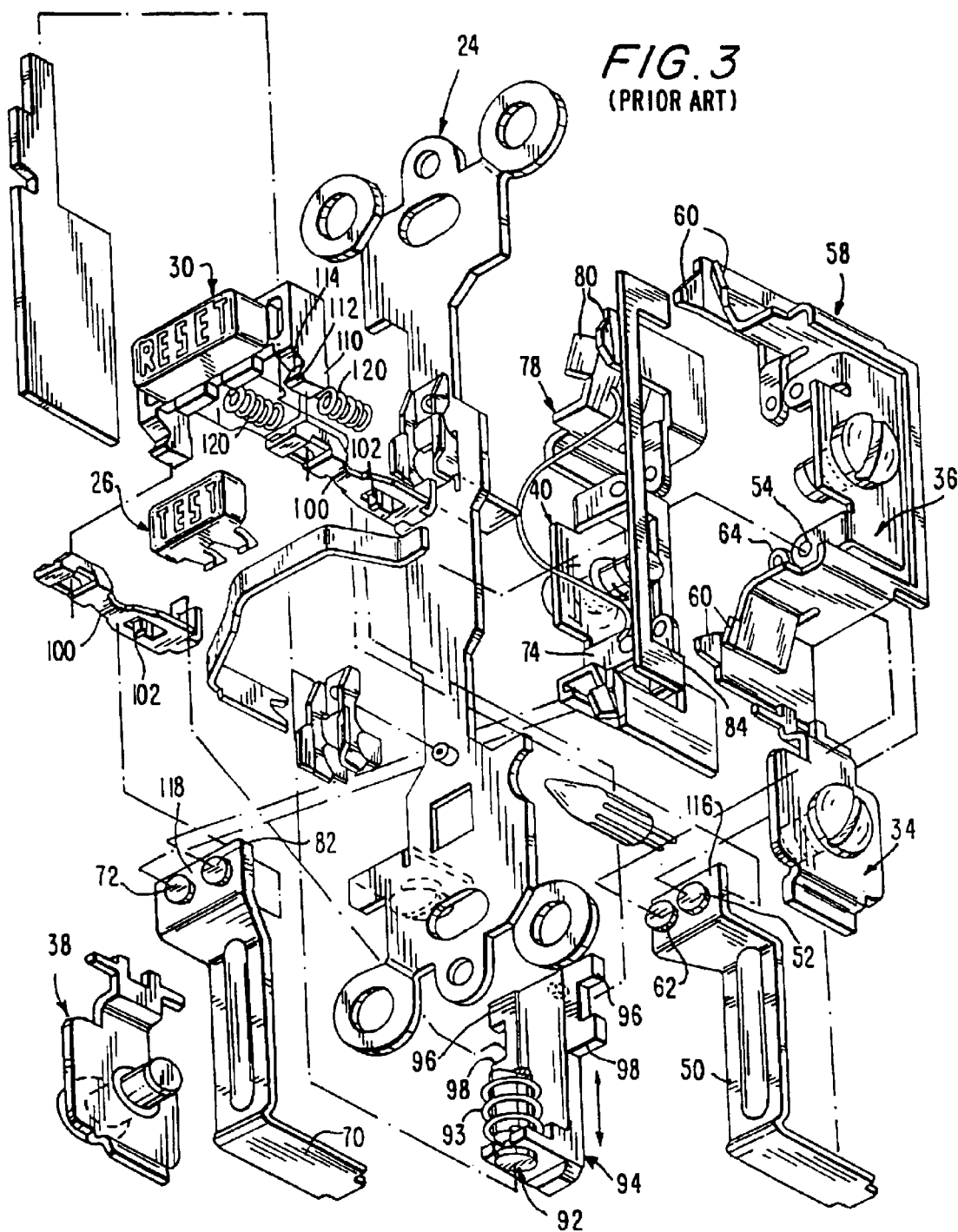
FIG. 3 is an exploded view of internal components of the prior art GFCI device of FIG. 1.
Figure 4:
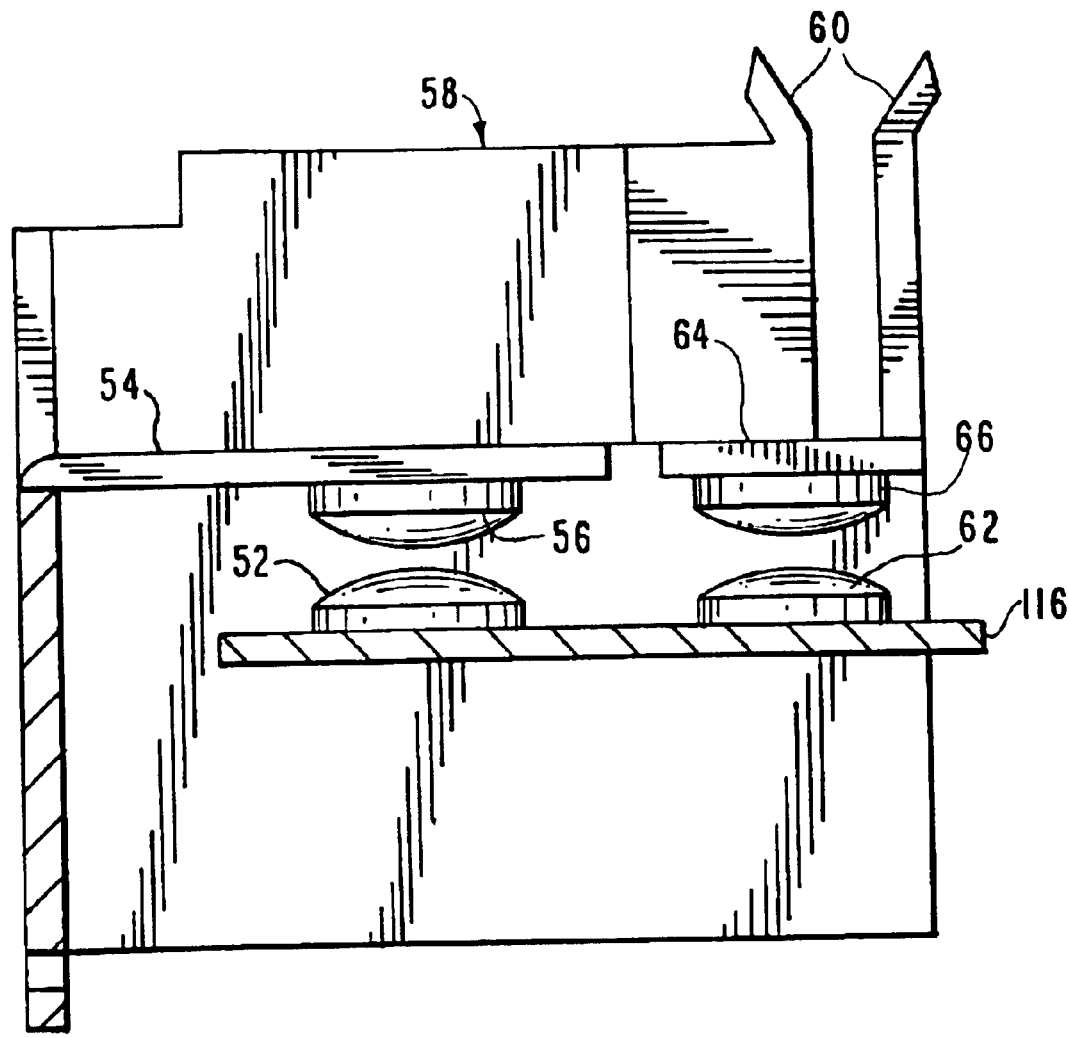
FIG. 4 is a partial sectional view of a portion of a conductive path shown in FIG. 3.

FIGS. 1, 2 and 3 are of a GFCI device such as is disclosed in commonly owned U.S. Pat. No. 6,246,558, which is incorporated in its entirety herein by reference, and where portions of which are here included to provide a full and complete understanding of the invention here disclosed. Turning to FIG. 1, the GFCI receptacle 10 has a housing 12 consisting of a central body 14 to which a face or cover portion 16 and a rear portion 18 are removably secured. The face portion 16 has entry ports 20 and 21 for receiving normal or polarized prongs of a male plug of the type normally found at the end of a lamp or appliance cord set, as well as ground prong receiving openings 22 to accommodate a three wire lug. The receptacle also includes a mounting strap 24 used to fasten the receptacle to a junction box.

A test button 26 which extends through opening 28 in the face portion 16 of the housing 12 is used to activate a test operation, that tests the operation of the circuit interrupting portion (or circuit interrupter) disposed in the device. The circuit interrupting portion is used to break electrical continuity in one or more conductive paths between the line and load side of the device. A reset button 30 forming a part of the reset portion extends through opening 32 in the face portion 16 of the housing 12. The reset button is used to activate a reset operation, which reestablishes electrical continuity to open conductive paths. Electrical connections to existing household electrical wiring are made via binding screws 34 and 36, where screw 34 is an input or line phase connection, and screw 36 is an output or load phase connection. Two additional binding screws 38 and 40 (see FIG. 2) are located on the opposite side of the receptacle 10. These additional binding screws provide line and load neutral connections, respectively. A more detailed description of a GFCI receptacle is provided in U.S. Pat. No. 4,595,894, which is incorporated herein in its entirety by reference. Binding screws 34, 36, 38 and 40 are exemplary of the types of wiring terminals that can be used to provide the electrical connections. Examples of other types of wiring terminals include set screws, pressure clamps, pressure plates, push-in type connections, pigtails and quick connect tabs.

Referring to FIG. 2, the conductive path between the line phase connector 34 and the load phase connector 36 includes contact arm 50 which is movable between a stressed and an unstressed position, contact 52 mounted to movable contact arm 50, contact arm 54 secured to or monolithically formed into the load phase connection 36 and fixed contact 56 mounted to the contact arm 54. The user accessible load phase connection for this embodiment includes terminal assembly 58 having two binding terminals 60 which are capable of engaging a prong of a male plug inserted there between. The conductive path between the line phase connection 34 and the user accessible load phase connection includes contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Similar to the above, the conductive path between the line neutral connector 38 and the load neutral connector 40 includes contact arm 70 which is movable between a stressed and an unstressed position, movable contact 72 mounted to contact arm 70, contact arm 74 secured to or monolithically formed into load neutral connection 40, and fixed contact 76 mounted to contact arm 74. The user accessible load neutral connection for this embodiment includes terminal assembly 78 having two binding terminals 80 which are capable of engaging a prong of a male plug inserted there between. The conductive path between the line neutral connector 38 and the user accessible load neutral connector includes contact arm 70, contact arm 84 secured to or monolithically formed into terminal assembly 78, and fixed contact 86 mounted to contact arm 84. These conductive paths are collectively called the neutral conductive path.

Continuing with FIG. 2, the circuit interrupting portion has a circuit interrupter and electronic circuitry capable of sensing faults, e.g., current imbalances, on the hot and/or neutral conductors. In an embodiment of the GFCI receptacle, the circuit interrupter includes a coil assembly 90, a plunger 92 responsive to the energizing and de-energizing of the coil assembly and a banger 94 connected to the plunger 92. The banger 94 has a pair of banger dogs 96 and 98 which interact with movable latching members 100 used to set and reset electrical continuity in one or more conductive paths. The coil assembly 90 is activated in response to the sensing of a ground fault by, for example, the sense circuitry shown in FIG. 5 that includes a differential transformer that senses current imbalances.

The reset portion includes reset button 30, movable latching members 100 connected to the reset button 30, latching fingers 102 and normally open momentary reset contacts 104 and 106 that temporarily activate the circuit interrupting portion when the reset button is depressed, when in the tripped position. The latching fingers 102 are used to engage side R of each contact arm 50, 70 and move the arms 50, 70 back to the stressed position where contacts 52, 62 touch contacts 56, 66 respectively, and where contacts 72, 82 touch contacts 76, 86 respectively. At this time the GFCI is in its conducting state and the reset button 30 is in the first position, that being where the top surface of the button is substantially flush with the GFCI. As can be seen in FIG. 2, the engagement of latching finger with the bottom surface of movable member 50 limits the upward movement of reset button to be substantially flush with the top surface of the GFCI.

The movable latching members 100 can be common to each portion (i.e., the circuit interrupting, reset and reset lockout portions) and used to facilitate making, breaking or locking out of electrical continuity of one or more of the conductive paths. However, the circuit interrupting devices according to the present application also contemplate embodiments where there is no common mechanism or member between each portion of between certain portions. Further, the present application also contemplates using circuit interrupting devices that have circuit interrupting, reset and reset lockout portions to facilitate making, breaking or locking out of the electrical continuity of one or both of the phase or neutral conductive paths.

In the embodiment shown in FIGS. 2 and 3, the reset lockout portion includes latching fingers 102 which, after the device is tripped, engages side L of the movable arms 50, 70 so as to block the movable arms 50, 70 from moving. By blocking movement of the movable arms 50, 70; contacts 52 and 56, contacts 62 and 66, contacts 72 and 76, and contacts 82 and 86 are prevented from touching. Alternatively, only one of the movable arms 50 or 70 may be blocked so that their respective contacts are prevented from touching. Further, in this embodiment, latching fingers 102 act as an active inhibitor to prevent the contacts from touching. Alternatively, the natural bias of movable arms 50 and 70 can be used as a passive inhibitor that prevents the contacts from touching. As just noted, after the device is tripped and is in its non-conducting state, the latching finger 102 is located above the top side of the movable member 50 and does not engage movable member 50. Thus, latching member 100 is free to move to its uppermost position to position the reset button to the second position, that being where the top of the reset button projects beyond the top surface of the GFCI.

Thus, when the device is in the conducting state, the top of the reset button is substantially flush with the top surface of the device; and, when the device is in the non-conducting state, the top of the reset button is at a new position which is beyond the top surface of the device.

Referring to FIG. 2, the GFCI receptacle is shown in a set position where movable contact arm 50 is in a stressed condition so that movable contact 52 is in electrical engagement with fixed contact 56 of contact arm 54. If the sensing circuitry of the GFCI receptacle senses a ground fault, the coil assembly 90 is energized to draw plunger 92 into the coil assembly 90 and banger 94 moves upwardly. As the banger moves upward, the banger front dog 98 strikes the latch member 100 causing it to pivot in a counterclockwise direction about the joint created by the top edge 112 and inner surface 114 of finger 110. The movement of the latch member 100 removes the latching finger 102 from engagement with side R of the remote end 116 of the movable contact arm 50, and permits the contact arm 50 to return to its pre-stressed condition opening contacts 52 and 56.

After tripping, the coil assembly 90 is de-energized, spring 93 returns plunger 92 to its original extended position and banger 94 moves to its original position releasing latch member 100. At this time, the latch member 100 is in a lockout position where latch finger 102 inhibits movable contact 52 from engaging fixed contact 56. One or both latching fingers 102 can act as an active inhibitor to prevent the contacts from touching. Alternatively, the natural bias of movable arms 50 and 70 can be used as a passive inhibitor that prevents the contacts from touching.

To reset the GFCI receptacle so that contacts 52 and 56 are closed and continuity in the phase conductive path is re-established, the reset button 30 is depressed sufficiently to overcome the bias force of return spring 120 and moves the latch member 100 in the direction of arrow A. Depressing the reset button 30 causes the latch finger 102 to contact side L of the movable contact arm 50 and, continued depression of the reset button 30, forces the latch member to overcome the stress force exerted by the arm 50 to cause the reset contact 104 on the arm 50 to close on reset contact 106. Closing the reset contacts activates the operation of the circuit interrupter by, for example simulating a fault, so that plunger 92 moves the banger 94 upwardly striking the latch member 100 which pivots the latch finger 102, while the latch member 100 continues to move in the direction of arrow A. As a result, the latch finger 102 is lifted over side L of the remote end 116 of the movable contact arm 50 onto side R of the remote end of the movable contact arm. Contact arm 50 now returns to its unstressed position, opening contacts 52 and 56, and contacts 62 and 66, to terminate the activation of the circuit interrupting portion, thereby de-energizing the coil assembly 90.

After the circuit interrupter operation is activated, the coil assembly 90 is de-energized, plunger 92 returns to its original extended position, banger 94 releases the latch member 100, and latch finger 102 is in a reset position. Release of the reset button causes the latching member 100 and movable contact arm 50 to move in the direction of arrow B until contact 52 electrically engages contact 56, as seen in FIG. 2.

Figure 7:
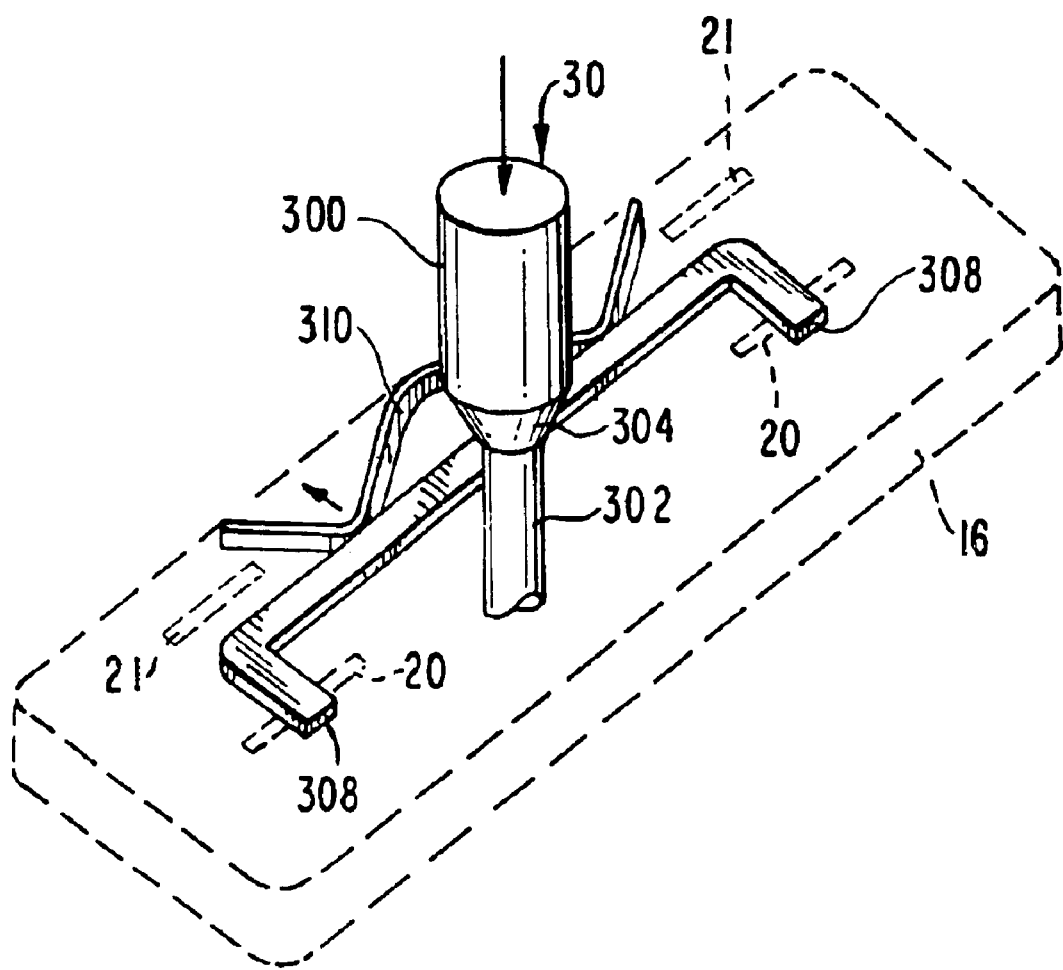

Referring to FIG. 7, there is shown a partial view of the blocking member and reset button in the GFCI where the top of the receptacle is shown in dotted outline to more clearly show the relationship between the blocking member, reset button and receptacle openings 20, 21 for receiving the prongs of a plug. In this embodiment, the blocking member 306 is located between the housing 12 and the cover portion 16 of the receptacle and is selectively operated to block the plug receiving openings 20 in the face of the receptacle 16 when the GFCI is in its non-conducting state, and allow the prongs of a plug to be inserted into the openings when the device is in its conducting state.

In FIG. 7, the blocking member 306 is located under the cover portion of the receptacle and supports two end portions 308 which can be positioned to selectively block the openings 20. The blocking member can be composed of insulating or conducting material and be made from flat sheet material or wire. The reset button 30 is positioned to contact an edge of the blocking member and has an upper section 300, a lower section 302 and an intermediate section 304. The reset button can be circular, rectangular or square, and the upper section has a width or diameter that is greater than that of the lower section.

Referring to FIG. 1, the blocking member 306 (shown in dotted outline), which is made of flat stock insulating material, is located within the body of the face portion 16 or immediately behind the face portion of housing 12, and supports blocking ends 308 positioned to assume a first position which blocks at least one opening, such as openings 20 in the receptacle or a second position which does not block the openings in the receptacle. The blocking ends of the blocking member, when in the first position, are located between the plug receiving openings in the face portion of the receptacle and top end of the electrical contacts of the receptacle associated with the openings.

Returning to FIG. 7, the blocking member 306 is urged by spring 310 to be in constant contact with the reset button 30. When the blocking member 306 engages the lower section 302 of the reset button, the blocking ends 308 of the blocking member is positioned to block the receptacle openings 20 to prevent a prong of a plug from engaging the receptacle contacts. In a similar manner, when the blocking member 306 engages the upper section 300 of the reset button, the blocking ends 308 of the blocking member are positioned away form the receptacle openings 20 and the prongs of a plug can be inserted into the receptacle. The geometries of the blocking member, the openings 20 in the receptacle and the reset button, and their positions relative to each other are such that the receptacle openings are blocked when the blocking member engages the lower section 302 of the reset button and they are not blocked when the blocking member engages the upper section 300. The conical or intermediate section 304 enables the blocking member to easily transition between the sections 302 and 300 as the reset button moves up or down.

As noted above, when the GFCI is in the conductive state the reset button is in its first position, that of being located substantially within the housing of the GFCI. When in this state, the upper section 300 of the reset button engages and moves the blocking member 306 against the force of the spring 310 to position the ends 308 to clear (not block) the receptacle openings 20. When the GFCI is in the non-conductive state, the reset button is in its second position, that of projecting outward beyond the top surface of the receptacle. When in this state, the lower section 302 of the reset button, through the action of spring 310, moves the blocking member 306 to position the ends 308 to block the receptacle openings 20.

Thus, in operation, the blocking member blocks at least one opening of each receptacle when the GFCI is in the tripped or non-conducting state. Once a reset is attempted, if functional, as the reset button is depressed and released, it lifts the contact arm 50 which closes the main contacts and the reset button stays in the first position. At this time the upper section 300 of the reset button moves the ends of the blocking member away from the openings in the receptacle to allow the prongs of a plug to be inserted.

Figure 5:
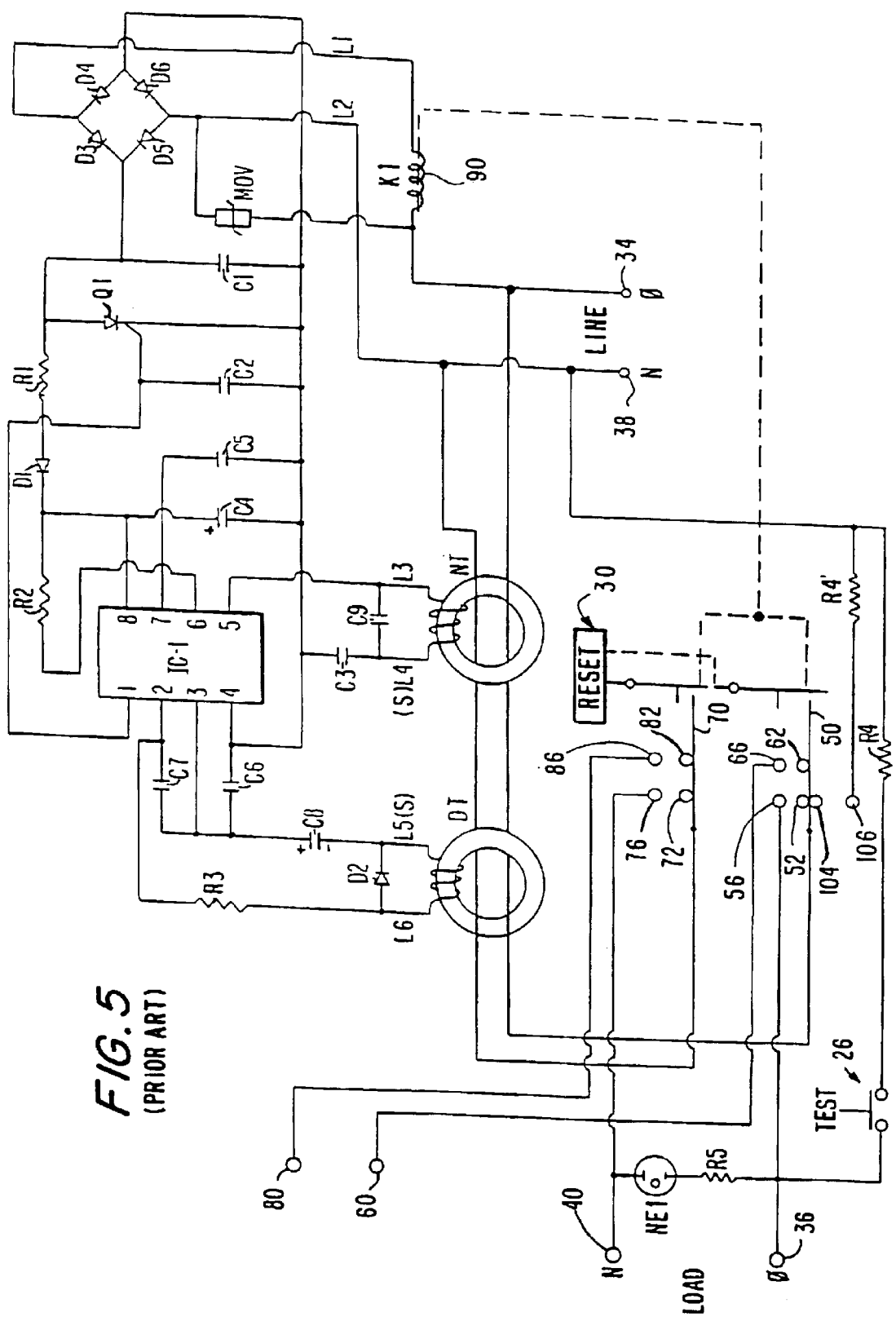
FIG. 5 is a schematic diagram of the circuit of the GFCI device of FIG. 1.
Figure 6:
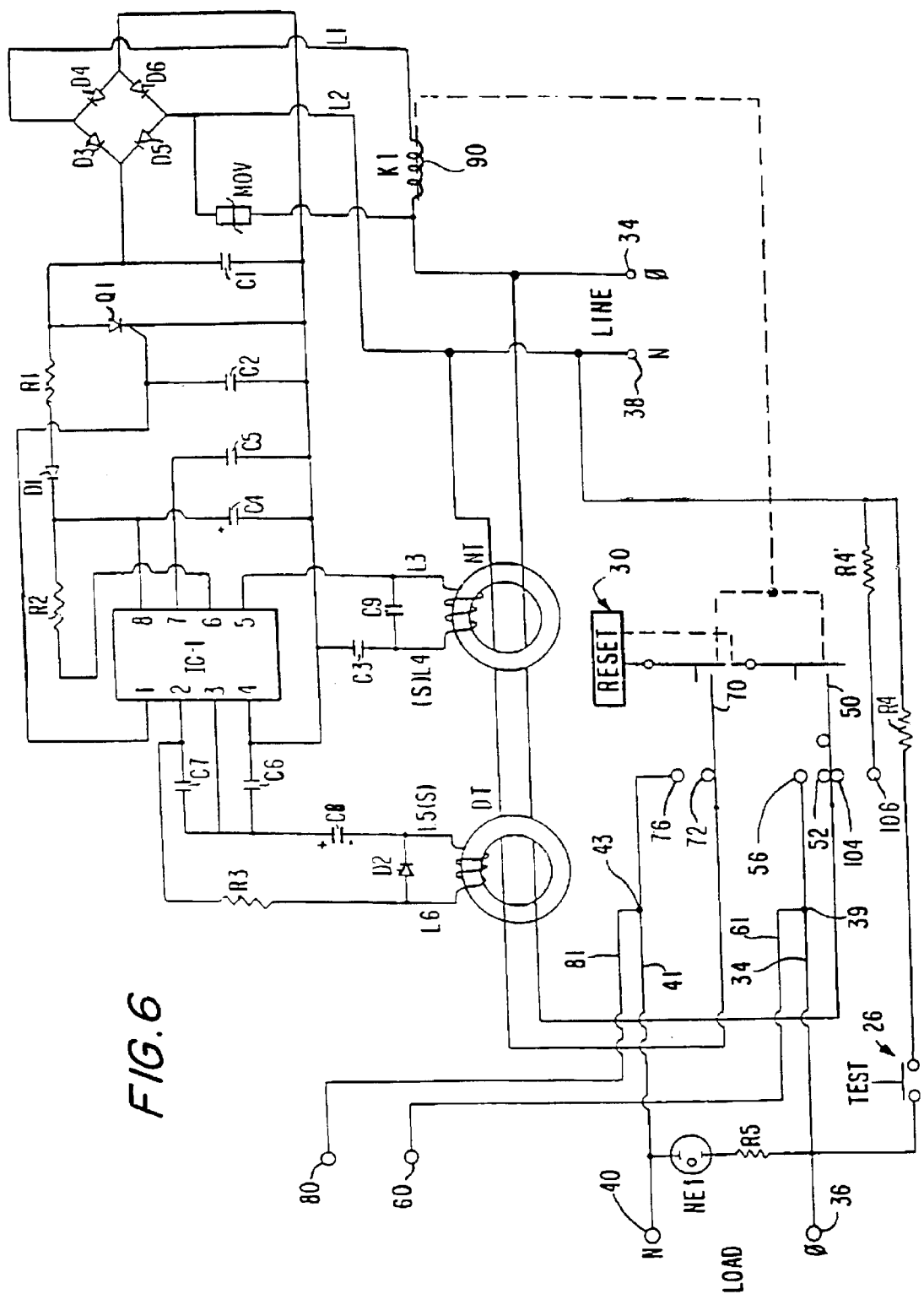
FIG. 6 is a schematic diagram of a GFCI device which has no bridge contacts; and, FIG. 7 is a top partial view of a blocking member in a GFCI device in accordance with the principles of the invention where the cover portion of the receptacle is shown in phantom.

Referring to the prior art schematic diagram shown in FIG. 5, the circuit of the GFCI for detecting faults utilizes bridge contacts to provide protection for the receptacle contacts. More specifically, contact arm 50 supports two contacts 52 and 62. Contact 52 cooperates with contact 56 and contact 62 cooperates with contact 66. In operation, when the prior art GFCI is in its no fault state, contacts 52 and 56 are closed and contacts 62 and 66 are closed to allow receptacle contact 60 to be connected to the load phase contact 36. When the GFCI is in its fault state, contacts 52 and 62 are not connected to contacts 56 and 66 respectively. Contacts 52, 56 and 62, 66 are referred to as bridge contacts. They provide isolation between the line phase contact 34, the load phase contact 36 and the receptacle contact 60. In a similar manner, bridge contacts 72, 76 and 82, 86 provided isolation of the line neutral contact 38 from the load neutral contact 40 and the receptacle contact 80. A more economical separation of the line neutral contact 38 and line phase contact 34 from the receptacle contacts and the load contacts is disclosed in FIG. 6. Referring specifically to contact arm 50, movable contact 62 and fixed contact 66 are not required and are eliminated, and lead 61 from receptacle contact 60 is connected at point 39 to lead 37 which connects contact 36 to contact 56. In a similar manner, movable contact 82 attached to contact arm 70 and fixed contact 86 are not now required and are eliminated, and lead 81 from receptacle contact 80 is connected at point 43 to lead 41 which connects contact 40 to contact 76. As shown in FIG. 6, the contacts 60, 80 of the receptacle and the contacts 36, 40 of the load are connected together and they, in turn, are connected to the line contacts 34, 38 only when the GFCI is in a no fault ( conducting) state. Under normal operating conditions when there is no fault on the line, current flow is from the line contacts through the GFCI to the load contacts 36, 40 and to the receptacle contacts 60, 80.

Although the components used during circuit interrupting and device reset operations as described above are electro-mechanical in nature, the present application also contemplates using electrical components, such as solid state switches and supporting circuitry, as well as other types of components capable of making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed is:

1. A circuit interrupting device comprising:
    a housing;
    a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;
    a circuit interrupting portion disposed within said housing comprising a movable arm having contacts thereon adapted to disengage from fixed contacts to cause electrical discontinuity in said phase and neutral conductive paths between said line side and said load side upon the occurrence of a predetermined condition;
    a reset portion disposed at least partially within said housing and configured to reestablish electrical continuity in said phase and neutral conductive paths;
    said circuit interrupting device further comprising a reset lockout portion that prevents reestablishing electrical continuity in said phase and neutral conductive paths if said circuit interrupting portion is non-conducting, or if an open neutral condition exists or if a reverse wiring condition exists;
    wherein said reset portion comprises:
        a reset button adapted to assume a first or second position relative to the housing when the circuit interrupting device is in a conducting or non-conducting state; and
        at least one reset contact which is capable of contacting at least a portion of said phase conductive path to cause said predetermined condition, wherein if said circuit interrupting portion is operational, the circuit interrupting portion is activated to disable said reset lockout portion and facilitate reestablishing electrical continuity in said phase and neutral conductive paths, and wherein if said circuit interrupting portion is non-conducting, said reset lockout portion remains enabled so that reestablishing electrical continuity in said phase and neutral conductive paths is prevented; and blocking means coupled to the reset button to block the third connection from being connected to a user accessible load while the circuit interrupting portion is in a non-conducting state.

2. The circuit interrupting device of claim 1 wherein the blocking means is adapted to assume a first position to allow the third connection to be connected to the user accessible load while the circuit interrupting portion is conducting and a second position to prevent the third connection being connected to the user accessible load while the circuit interrupting portion is non-conducting.

3. The circuit interrupting device of claim 2 wherein the blocking means is moved to the first or second position by the reset button.

4. The circuit interrupting device of claim 3 wherein the reset button is adapted to assume a first position when the device is conducting and a second position when the device is non-conducting, wherein the blocking means comprises a blocking member coupled to be moved by the reset button to the first position when the device is conducting, and wherein the position of the reset button is determined by the position of the movable arm.

5. The circuit interrupting device of claim 4 wherein the blocking member is of insulating material.

6. The circuit interrupting device of claim 4 wherein the reset button comprises a first section having a first dimension and a second section having a second dimension wherein the blocking member is positioned to block at least one opening in the receptacle when the second section of the reset button engages the blocking member.

7. The circuit interrupting device of claim 6 wherein, upon occurrence of the predetermined condition, the reset button is positioned to allow the second section of the reset button to engage the blocking member.

8. The circuit interrupting device of claim 7 wherein the movable arm is coupled to position the reset button to enable the second section of the reset button to engage the blocking member.

9. A circuit interrupting device comprising:

a housing;

a first electrical conductive path disposed at least partially within said housing and terminating at a first connection, said first connection capable of being electrically connected to a source of electricity, a second electrical conductive path disposed at least partially within said housing and terminating at a second connection, said second connection capable of being electrically connected to at least one load when electrical continuity between said first and second electrical conductive paths is made;

a third electrical conductive path disposed at least partially within said housing and terminating at a third connection, said third connection capable of being electrically connected to at least one user accessible load when electrical continuity between said first and third electrical conductive paths is made;

a circuit interrupting portion disposed within said housing comprising a movable arm having contacts thereon adapted to disengage from fixed contacts to break electrical continuity between said first and second conductive paths and between said first and third conductive path upon the occurrence of a predetermined condition;

a reset portion disposed at least partially within said housing and configured to make electrical continuity between said first and second conductive paths and between said first and third conductive paths;

said circuit interrupting device further comprising a reset lockout portion that prevents the making of electrical continuity between said first and second conductive paths and between said first and third conductive paths, if said circuit interrupting portion is non-conducting;

wherein said reset portion comprises:

a reset button adapted to assume a first or second position relative to the housing when the circuit interrupting device is in a conducting or non-conducting state;

and at least one reset contact which is capable of contacting at least a portion of one of said first or second conductive paths to cause said predetermined condition, wherein if said circuit interrupting portion is conducting, said circuit interrupting portion is activated to disable said reset lockout portion and facilitate making of electrical continuity between said first and second conductive paths and between said first and third conductive paths, and wherein if said circuit interrupting portion is non-conducting, said reset lockout portion remains enabled so that making of electrical continuity between said first and second conductive paths and between said first and third conductive paths is prevented; and blocking means coupled to the reset button to block the third connection from being connected to a user accessible load upon the occurrence of the predetermined condition.

10. A circuit interrupting device comprising:

a housing;

a first electrical conductive path disposed at least partially within said housing and terminating at a first connection, said first connection capable of being electrically connected to a source of electricity, a second electrical conductive path disposed at least partially within said housing and terminating at a second connection, said second connection capable of being electrically connected to at least one load when electrical continuity between said first and second electrical conductive paths is made:

a third electrical conductive path disposed at least partially within said housing and terminating at a third connection, said third connection being electrically connected directly to the second electrical conductive path and capable of being electrically connected to at least one user accessible load when electrical continuity between said first and second electrical conductive paths is made;

a circuit interrupting portion disposed within said housing comprising a movable arm having at least one contact thereon adapted to disengage from a fixed contact to break electrical continuity from said first to said second and third conductive paths upon the occurrence of a predetermined condition;

a reset portion disposed at least partially within said housing and configured to make electrical continuity from said first to said second and/or third conductive paths;

said circuit interrupting device further comprising a reset lockout portion that prevents the making of electrical continuity from said first to said second and third conductive paths, if said circuit interrupting portion is non-conducting;

wherein said reset portion comprises:

a reset button adapted to assume a first or second position relative to the housing when the circuit interrupting device is in a conducting or non-conducting state; and at least one reset contact which is capable of contacting at least a portion of one of said first, second or third conductive paths to cause said predetermined condition, wherein if said circuit interrupting portion is conducting, said circuit interrupting portion is activated to disable said reset lockout portion and facilitate making of electrical continuity from said first to said second and third conductive paths, and wherein if said circuit interrupting portion is non-conducting, said reset lockout portion remains enabled so that making of electrical continuity from said first to said second and third conductive paths is prevented; and blocking means coupled to the reset button to block the third connection from being connected to a user accessible load upon the occurrence of the predetermined condition.

11. The circuit interrupting device of claim 10 wherein the blocking means is adapted to assume a first position to allow the third connection to be connected to the user accessible load while the circuit interrupting portion is conducting and a second position to block the third connection from being connected to the user accessible load while the circuit interrupting portion is non-conducting.

12. The circuit interrupting device of claim 11 wherein the blocking means comprises a blocking member coupled to the reset button.

13. The circuit interrupting device of claim 12 wherein the blocking member is of insulating material.

14. The circuit interrupting device of claim 12 wherein the blocking member is engaged by a first or second section of the reset button and wherein the blocking member is positioned to block at least one opening in the receptacle when engaged by the second section of the reset button.

15. The circuit interrupting device of claim 12 wherein the first and second sections of the reset button have different dimensions.

16. The circuit interrupting device of claim 15 wherein the reset button comprises a third section interposed between the first and second sections to enable the blocking member to transition between the first and second sections.

17. A circuit interrupting device comprising:

housing means;

first electrical conductive path means for conducting electricity within said housing means, and capable of electrically connecting to a source of electricity;

second electrical conductive path means for conducting electricity within said housing means, and capable of electrically connecting to at least one load when electrical continuity with said first electrical conductive path means is made;

third electrical conductive path means for conducting electricity within said housing means, and capable of electrically connecting to at least one user accessible load when electrical continuity with said first electrical conductive path means is made;

circuit interrupting means disposed within said housing means comprising a movable arm having contacts thereon adapted to disengage from fixed contacts for breaking electrical continuity from said first to said second and third conductive path means, upon the occurrence of a predetermined condition;

reset means disposed at least partially within said housing means for reestablishing electrical continuity from said first to said second and third conductive path means;

wherein said reset means comprises:

a reset button adapted to assume a first or second position relative to the housing when the circuit interrupting device is in a conducting or non-conducting state;

and reset contact means operatively associated with said reset button for activating said circuit interrupting means by causing said predetermined condition when said reset button is depressed; and blocking means positioned by the reset button to block the third electrical conductive path means from being connected to the at least one user accessible load during the occurrence of the predetermined condition.

18. The circuit interrupting device of claim 17 wherein the blocking means is adapted to assume a first position to block the third connection from being connected to the user accessible load upon the occurrence of the predetermined condition and a second position to allow the third connection to be connected to the user accessible load upon the termination of the predetermined condition.

19. The circuit interrupting device of claim 18 wherein the reset button is coupled to the movable arm of the circuit interrupting means to position the blocking member to the first or second position.

20. The circuit interrupting device of claim 19 wherein the blocking member is of insulating material.

21. The circuit interrupting device of claim 19 wherein the blocking member is engaged by a first or second section of the reset button wherein the blocking member is positioned to block at least one opening in the receptacle when engaged by the second section of the reset button.

22. A circuit interrupting system comprising:

a source of power;

a circuit interrupting device having fault protection at both line and load sides of said device connected to said source of power;

at least one load connected to said circuit interrupting device;

wherein said circuit interrupting device comprises:

a housing;

a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;

a circuit interrupting portion comprising a movable arm having contacts thereon adapted to disengage from fixed contacts disposed within said housing and configured to cause electrical discontinuity in said phase and neutral conductive paths at both said line side and said load side upon the occurrence of a predetermined condition;

a reset portion disposed at least partially within said housing and configured to reestablish electrical continuity is said phase and neutral conductive paths;

said circuit interrupting device further comprising a reset lockout portion that prevents reestablishing electrical continuity in said phase and neutral conductive paths if said circuit interrupting portion is non-conducting or if an open neutral condition exists;

wherein said reset portion comprises;

a reset button adapted to assume a first or second position relative to the housing when the circuit interrupting device is in a conducting or non-conducting state;

and at least one reset contact which is capable of contacting at least a portion of said phase conductive path to cause said predetermined condition wherein if said circuit interrupting portion is conducting, said circuit interrupting portion is activated to disable said reset lockout portion and facilitate reestablishing electrical continuity in said phase and neutral conductive paths, and wherein if said circuit interrupting portion is non-conducting, said reset lockout portion remains enabled so the reestablishing electrical continuity in said phase and neutral conductive paths is prevented; and blocking means coupled to the reset button to block the third connection from being connected to the at least one user accessible load while the circuit interrupting device is in a non-conducting state.

23. The circuit interrupting device of claim 22 wherein the blocking means is adapted to assume a first position to prevent the third connection being connected to the user accessible load while the circuit interrupting portion is non-conducting and a second position to allow the third connection to be connected to the user accessible load while the circuit interrupting portion is conducting.

24. The circuit interrupting device of claim 23 wherein the position of the reset button is determined by the position of the movable arm of the circuit interrupting portion.

25. The circuit interrupting device of claim 24 wherein the reset button is coupled to the movable arm of the circuit interrupting portion to couple a first section of a first dimension or a second section of a second dimension on the reset button to the blocking member.

26. The circuit interrupting device of claim 25 wherein the blocking member is of insulating material.

\* \* \* \* \*